United States Patent [19]

Richmond

[11] 3,907,642

[45] Sept. 23, 1975

[54] CHOLESTEROL OXIDASE AND METHOD OF EXTRACTING FROM NOCARDIA

[75] Inventor: William Richmond, Harrow, England

[73] Assignee: National Research Development Corporation, England

[22] Filed: Sept. 15, 1972

[21] Appl. No.: 289,581

[30] Foreign Application Priority Data
Sept. 22, 1971 United Kingdom............... 44095/71
June 11, 1972 United Kingdom............... 28650/72

[52] U.S. Cl. ...................... 195/62; 195/66; 195/63; 195/103.5 R; 195/51 R
[51] Int. Cl............................................. C07g 7/028
[58] Field of Search ...... 195/62, 63, 66, 51 G, 51 R

[56] References Cited
OTHER PUBLICATIONS
Chemical Abstracts 66 83303n (1968).
J. Biol. Chem. 206 511–523 (1954).
J. Bact. 47 487–494 (1944).
Bio. Chem. J. 42 376–383 (1948).

*Primary Examiner*—Alvin E. Tanenholtz

[57] ABSTRACT

Enzyme preparations which will convert cholesterol to $\Delta^4$-cholestenone and hydrogen peroxide are obtained from certain Nocardia species belonging to the *Mycobacterium rhodocrous* group. The preparations have a cholesterol oxidase specific activity of at least 1 unit per 5 mg of protein nitrogen and, when in liquid form, a potency of at least $10^{-2}$ units/ml. They are prepared by growing the organism and recovering the enzyme preparation, preferably by extracting the harvested cells with a surface active agent such as Triton X-100. The enzyme preparations are used to assay for cholesterol by measuring the amount in which one of the products of the cholesterol oxidase reaction, preferably hydrogen peroxide, is formed or the quantity in which oxygen is used.

21 Claims, No Drawings

CHOLESTEROL OXIDASE AND METHOD OF EXTRACTING FROM NOCARDIA

This invention relates to the assay of cholesterol in liquids and particularly biological fluids such as serum.

The assay of total cholesterol, in its role as an indicator of atherosclerosis and incipient coronary heart disease, now constitutes about 3% of the total number of tests performed in the average clinical chemistry laboratory. In Britain at the present time this represents about 1½ million cholesterol assays per year.

Cholesterol is currently assayed by the Liebermann-Burchard reaction which involves the use of highly corrosive and viscous reagents and presents many obstacles to automation.

It is an object of the present invention to provide an assay for cholesterol which does not have the disadvantages of the Liebermann-Burchard reaction and which can be readily automated.

Many Nocardia species are capable of metabolising cholesterol and in particular Stadtman et al (J. Biol. Chem. (1954) 206 511–523) has disclosed that a soil Mycobacterium is capable of oxidising cholesterol to $\Delta^4$-cholestenone. The so-called "cholesterol dehydrogenase" responsible for this reaction can be obtained in a cell-free form of low activity. The production of this cholesterol dehydrogenase from the same soil Mycobacterium as a slightly purer soluble enzyme preparation and the determination of the activity of the enzyme is described by Stadtman in Methods in Enzymology (1955) 1 678–681 but the soluble enzyme is still of low activity and no significant purification was achieved.

It has now been found that two micro-organisms identified as Nocardia species belonging to the socalled *Mycobacterium rhodocrous* group have cholesterol oxidase activity, i.e. they convert cholesterol to $\Delta^4$-cholestenone and hydrogen peroxide, and that this provides the basis for an enzymic assay for cholesterol which can be readily be automated and which obviates the difficulties of the Liebermann-Burchard reaction.

These two micro-organisms are referred to as "rough" and "smooth" strains and have been given the numbers NCIB 10554 and NCIB 10555 respectively by the National Collection of Industrial Bacterial Torry Research Station, Aberdeen. The micro-organisms have also been deposited with the Agricultural Research Service of the United States Department of Agriculture as the ARS Culture Collection Investigations Fermentation Laboratory, Peoria, Ill., U.S.A. where they have been given the numbers NRRL 5635 and NRRL 5636.

Full details of the organisms are as follows:

Rough Colony NCIB 10554 (NRRL 5635)

Morphology (Nutrient agar 30°C)

Gram-positive, coryneform organisms. No well-developed mycelium, but rudimentary branching present. Coccoid forms appear as the culture ages. Non-motile.

Colonial morphology (nutrient agar 5 days 30°C)

Circular, flat, entire dry, opaque, creamy-orange colonies. 1.5–3 mm in diameter.

Yeast Dextrose Agar 5 days 30°C

Circular, raised, entire, opaque, pale pink colonies. Dry crusted surface. 1 mm diameter.

Gelatin Agar

Irregular colony edge, raised, dull crusted surface; opaque off-white colour.

Egg Yolk Agar plates

Irregular colony edge, raised, dull rough surface, opaque, buff-coloured.

Characteristics in liquid culture

White surface pellicle, white floccular deposit which does not completely disperse on shaking, no turbidity.

| Physiology | |
|---|---|
| Strict aerobe | |
| Gelatin hydrolysis | + |
| Casein hydrolysis | − |
| Starch hydrolysis | − |
| Kovacs oxidase | − |
| Catalase | + |
| Urease | + |
| Indole | − |
| Vogue-Proskauer (V-P) test | − |
| Methyl Red | − |
| Deamination of phenylalanine | − |
| Hippurate hydrolysis | − |
| Litmus milk | alkaline |
| Utilisation of compounds as sole carbon sources | |
| Citrate | + |
| Lactate | + |
| Malate | + |
| Succinate | + |
| Carbohydrates (acid) | |
| No acid was detectable in peptone water sugars. | |
| Ammonium based sugars | |
| Fructose | + |
| Glucose | + |
| Sucrose | + |
| Maltose | + |
| Glycerol | + |
| Sorbitol | + |
| Trehalose | + |
| Raffinose | + |
| Dulcitol | + |
| Lactose | − |
| Mannitol | − |
| Starch | − |
| Arabinose | − |

Smooth colony NCIB 10555 (NRRL 5636)

Morphology (Nutrient agar 30°C)

Gram-positive, coryneform organisms. No well-developed mycelium, but rudimentary branching present. Coccoid forms appear as the culture ages. Non-motile.

Colonial morphology (Nutrient agar 5 days 30°C)

Circular, entire, convex, semi mucoid, opaque creamy off-white colonies, 0.5–2mm diameter.

Yeast Dextrose agar 5 days 30°C

Convex, entire, smooth shiny, semi mucoid, pale pink colonies.

Gelatin agar

Convex, entire, smooth shiny, off-white, opaque colonies.

Egg Yolk agar plates.

Convex, entire, opaque, smooth shiny colonies. Moist surface. 1–3mm diameter.

Characteristics in liquid culture

White surface pellicle, white floccular deposit which does not completely disperse on shaking.

| Physiology | |
|---|---|
| Strict aerobe | |
| Gelatin hydrolysis | + |
| Casein hydrolysis | − |

-Continued

| | |
|---|---|
| Starch hydrolysis | − |
| Kovacs oxidase | − |
| Catalase | + |
| Indole | − |
| Voges-Proskauer (V-P) test | − |
| Methyl Red | − |
| Deamination of phenylalanine | − |
| Hippurate hydrolysis | − |
| Litmus milk | alkaline |
| Utilization of compounds as sole carbon sources | |
| Citrate | + |
| Lactate | + |
| Malate | + |
| Succinate | + |
| Carbohydrates (acid) | |
| Acid was not detectable in peptone water sugars. | |
| Ammonium based sugars. | |
| Fructose | − |
| Glucose | − |
| Sucrose | − |
| Maltose | + |
| Glycerol | + |
| Sorbitol | + |
| Trehalose | − |
| Raffinose | + |
| Dulcitol | + |
| Xylose | + |
| Arabinose | + |
| Mannitol | − |
| Starch | − |

The present invention provides an enzyme preparation derived from Nocardia species NCIB 10554 or NCIB 10555 having a cholesterol oxidase specific activity of at least 1 unit per 5 mg of protein nitrogen.

The preparation may be in liquid form or in solid, e.g. freeze-dried form. When the preparation is in solid form it must be reconstituted with buffer into a liquid form before it can be used in an assay.

Of the two micro-organisms Nocardia species NCIB 10554 (the rough strain) is preferred because of the greater ability of the cells of this strain to oxidise cholesterol to $\Delta^4$-cholestenone and hydrogen peroxide.

The minimum potency of the liquid cholesterol oxidase preparation depends on the assay method for which it is to be used. Thus in the case of a preparation which is to be used for the assay of cholesterol by the fluorimetric determination of hydrogen peroxide produced the potency need only be relatively small, a potency of $10^{-2}$ units/ml of liquid preparation being sufficient.

The assay for cholesterol can also be carried out by using non-fluorimetric methods for the determination of hydrogen peroxide, e.g. colorimetric methods, or by measuring the amount in which $\Delta^4$-cholestenone is formed or oxygen is consumed in the cholesterol oxidase reaction. In this case the potency of the cholesterol oxidase in the liquid preparation should be at least $10^{-1}$ units/ml.

Particularly for use in automated analysis it is preferred that the enzyme preparation have a cholesterol oxidase specific activity of at least 1 unit per 50 $\mu$g protein nitrogen and when made up in liquid form have a potency of at least 0.5 unit/ml.

When the assay depends on the determination of hydrogen peroxide the presence of catalase in the enzyme preparation reduces the sensitivity of the assay. Generally a catalase activity of less than 10% of the cholesterol oxidase activity i.e. less than $10^{-1}$ units of catalase activity per unit of cholesterol oxidase activity, is tolerable and preferably for the preparation should have a catalase activity of less than 1% of the cholesterol oxidase activity, i.e. less than $10^{-2}$ units of catalase activity per unit of cholesterol oxidase activity.

The catalase activity of the enzyme preparation depends on the method by which is has been prepared and when the preferred method is used as described below the preparation contains only small amounts of catalase which do not reduce the sensitivity of the assay. However if other methods are used and the preparation does include catalase this can either be removed in the purification step or inhibited with a catalase inhibitor, such as an azide, e.g. sodium azide.

As used herein one unit of cholesterol oxidase activity is defined as that activity which will oxidase 1 $\mu$ mol ($10^{-6}$ mol) of cholesterol to $\Delta^4$-cholestenone and hydrogen peroxide per minute at 30°C and pH7. One unit of catalase activity is defined as that activity which will convert 1 $\mu$ mol of hydrogen peroxide to water and oxygen per minute at 25°C anad pH7.

In general the enzyme preparations according to the invention are prepared by growing Nocardia species NCIB 10554 and NCIB 10555 and recovering therefrom an enzyme preparation having a cholesterol oxidase specific activity of at least 1 unit per 5 mg of protein nitrogen.

The production of the enzyme preparation can generally be divided into the following stages:
1. Growth of the micro-organism and harvesting of the cells;
2. EXtraction of the cholesterol oxidase activity from the cells; and
3. Purification and concentration of the preparation with cholesterol oxidase activity.

The micro-organism can be grown on any suitable medium and the cells harvested. Preferably the organism is grown in a culture medium comprising glycerol as a carbon source. An example of a suitable medium is:

| | g % |
|---|---|
| $(NH_4)_2SO_4$ | 0.2 |
| $CaCl_2.2H_2O$ | 0.001 |
| $FeSO_4.7H_2O$ | 0.001 |
| $K_2HPO_4$ | 0.2 |
| $MgSO_4.7H_2O$ | 0.02 |
| Glycerol | 0.5 |
| Yeast Extract | 2.0 |

To avoid precipitation of sparingly soluble salts, the above constituents are dissolved separately and then added to a conveniently large volume of distilled water in the order shown. The medium is then made up to the required volume. The preferred incubation temperature is about 29°C and the optimum pH is between pH 6.0 and pH 7.6. Preferably the pH is controlled at about pH 6.7.

Increased yields of cells can be obtained by aeration and agitation but the culture has a tendency to foam and high rates of air flow and agitation can not generally be used because of excessive foaming. An air flow rate of 0.2 v/v/min and an impeller speed of 760 rpm. has given rapid growth without excessive foaming. An anti-foam such as polypropylene glycol is preferably also used to control foaming.

If the initial inoculation of micro-organism into the culture medium is small there may be a lag phase of up to 16 hours. The lag phase is a function of the size of the inoculum and no lag is obtained if an inoculum greater than 2% (based on the final cell weight) is used.

The total incubation time required is generally about 18 to 24 hours. Under optimum conditions the doubling time of the culture is about 2 hours and a final cell harvest of at least 25 g (wet weight) per litre of cells (5 g dry weight) can be obtained. The culture can be carried out on a small scale in 5 litre or 10 litre vessels but excellent results have also been obtained in larger batches in 100 litre and 1000 litre vessels, in the latter case using a 500 litre batch.

Cholesterol oxidase production is growth associated with a lag behind cell growth. The enzyme level continues to increase for at least 2 hours after the cells stop growing. Although the enzyme cholesterol oxidase is produced in the absence of an inducer the yield of enzyme can be increased by inducing with cholesterol. Small quantities of cholesterol may be added to the culture as a saturation solution in acetone but for larger quantities the cholesterol is preferably made up as a slurry in water and a wetting agent (e.g. Tween 80) and the resulting slurry sonicated to break up the cholesterol particles into a fine suspension before addition to the culture.

As examples of the effect of the inducer 0.2 g/l cholesterol added at a cell concentration of 5 g (wet weight)/l give an increase in enzyme production by the rough strain NCIB 10554 of the order of 4 fold and 1.5 g/l cholesterol added at the same cell concentration given an increase in enzyme production of the order of 30 fold.

The cells may be harvested by centrifugation. It can be demonstrated at this stage that the cells themselves have cholesterol oxidase activity with a typical specific activity of the cells of the rough strain being about 0.5 $\mu$ mols/mg/hour.

Cholesterol oxidase activity can be extracted by disrupting the cells and subsequently removing cell debris. Electron microscopy has revealed that the forces encountered in grinding and sonication tend to produce fragmentation without secondary damage to the cell wall. In disruption processes giving more efficient release of cholesterol oxidase activity little fragmentation occurs but damage to the cell wall is extensive. The efficiency of a variety of techniques of cell rupture are illustrated below:

| Method of Rupture | % Total Activity Recovered in Homogenate | Recovered as Soluble Enzyme |
| --- | --- | --- |
| Grinding with cardice | 95% | 8.0% |
| Ultrasonication | 28% | 7.0% |
| Acetone Powder | 52% | 12.5% |
| Mickle apparatus | 33% | 22.0% |
| LKB X-press | 95% | 65.0% |

The preferred method of cell rupture is thus the use of an X-press.

Although the cholesterol oxidase activity can be removed by disrupting the cells and recovering the enzyme in a cell-free supernatant it has been found that the enzyme can be extracted without disruption of the cells. There are, in fact, indications that the cholesterol oxidase is situated on the surface of the organism and it has been found that it can be removed with good recovery of activity using a surface active agent. Non-ionic surface active agents have proved particularly suitable and very good results have been obtained with Triton X-100 (iso-octylphenoxypolyethoxyethanol containing approximately 10 moles of ethylene oxide).

To remove the cholesterol oxidase the cells are suspended in a solution of the surface active agent buffered at a suitable pH and the suspension stirred vigorously at, for example, room temperature. The cholesterol oxidase is recovered in the supernatant by removing the cells, for example by centrifugation. As the cells are not ruptured in this process protein release is low, for example about 100 $\mu$g/ml.

In experiments to demonstrate extraction with Triton X-100 5 g cells (wet weight) of the rough strain were suspended in 45 ml. 0.5M Tris/HCl buffer at pH 8.0 containing concentrations of 1%, 3% and 5% Triton X-100. The suspension was stirred vigorously at room temperature and 10 ml aliquots were removed at 15 minute intervals. On removal each aliquot was immediately centrifuged at 3500 rpm. in a Mistral 6L centrifuge. The extracts were assayed for cholesterol oxidase activity with the following results.

Table 1

| Extraction time mins | $\mu$g cholesterol oxidised/50 $\mu$l/15 mins | % recovery in supernatant |
| --- | --- | --- |
| 1% Triton X-100 | | |
| 15 | 30.0 | 56.0% |
| 30 | 35.0 | 65.5% |
| 45 | 35.0 | 65.5% |
| 60 | 37.5 | 70.0% |
| 120 | 36.5 | 68.3% |
| whole cells | 53.5 | — |
| 3% Triton X-100 | | |
| 15 | 36.0 | 68.5% |
| 30 | 35.5 | 67.5% |
| 45 | 38.5 | 73.5% |
| 60 | 38.5 | 73.5% |
| 120 | 41.0 | 78.0% |
| whole cells | 52.5 | — |
| 5% Triton X-100 | | |
| 15 | 34.0 | 62.5% |
| 30 | 37.5 | 69.0% |
| 45 | 38.5 | 71.0% |
| 60 | 38.0 | 70.0% |
| 120 | 41.0 | 75.0% |
| whole cells | 54.5 | — |

Thus 70% of the activity of the whole cells can be recovered at 1% Triton X-100 and up to 78% at 3% Triton X-100. The surface active agent will, however, remain in the cholesterol oxidase solution. In the assay method as described below it has been found that the presence of Triton X-100 may be advantageous but that the optimum concentration in the assay mixture is about 0.25%, higher concentrations being inhibitory. The enzyme preparation should thus not have a level of surface active agent greater than that which produces an acceptable level in the assay mixture. Thus although the most rapid release of enzyme can be obtained at 3% Triton X-100 it may be preferable to work at a lower concentration, e.g. 1% Triton X-100. It may, however, be necessary to remove the surface active agent, for example by dialysis or gel filtration, or alternatively by precipitating the protein (enzyme) out of the surface active agent solution.

Although the cholesterol oxidase preparation produced by extraction of the cells with a surface active agent may, in some cases, have a specific activity and a potency which is sufficient to conduct an assay it is almost always necessary to purify and concentrate the extract before it can be used practically in a cholesterol assay. In the case of a fluorimetric determination of hydrogen peroxide the enzyme preparation should have a potency of at least $10^{-2}$ units/ml to provide a result in a short enough time for an assay to be useful in practice and particularly where the analysis is automated the preparation should have a potency of at least $10^{-1}$ and preferably 0.5 units/ml.

In the case of a non-fluorimetric assay the preparation should have a potency of at least $10^{-1}$ units/ml and preferably for automated analysis at least 0.5 units/ml. The preparation may be prepared with a higher potency for example 5 units/ml or more but at higher levels of potency will generally be diluted with buffer before use in a test.

In all cases the preparation must have a cholesterol oxidase specific activity of at least 1 unit per 5 mg. protein nitrogen. At higher levels a protein nitrogen the amount of protein present may make the assay solution too viscous or interfere in the assay. A specific activity of at least 1 unit per 50 µg protein nitrogen is preferred. A particularly suitable enzyme preparation has been found to be an aqueous preparation with a specific activity of 1 unit of cholesterol oxidase activity per 28 µg protein nitrogen, a potency of 5 units/ml and containing 3% v/v Triton X-100. This preparation may be diluted for use in an assay, for example with 0.01M phosphate buffer, so that for automated analysis it contains 0.5 units/ml or for manual analysis 0.1 units/ml.

The enzyme preparation having cholesterol exidase activity need not be in aqueous form and it may be, for example, in the form of a freeze-dried powder. In addition to the preparation of a soluble lyophilised powder, the enzyme can be present as a concentrated, buffered solution or in suspension with ammonium sulphate (with or without added buffer).

Although very little protein is extracted with the cholesterol oxidase some catalase activity is generally present in the surfactant extract. The amount of catalase activity which can be tolerated in the final enzyme preparation depends upon the assay method to be used, the catalase activity of the preparation being important where the assay involves measuring the amount of $H_2O_2$ produced. As described in more detail below some assay methods in which $H_2O_2$ is determined include the use of peroxidase and in some cases it is possible to overpower limited amounts of catalase with peroxidase. In addition it is possible to inhibit any concentration of catalase likely to be found in the surfactant extract with an inhibitor for example sodium azide.

The effect of catalase on the sensitivity of an assay can be demonstrated as follows:

A catalase solution was prepared by dissolving 20 µl of a crystalline suspension of catalase in 50 ml 0.05 M phosphate buffer pH 7.0.

0.5 ml of this catalase solution was found to break down 7.04 µM $H_2O_2$ (in a final volume of 2.5 ml) in 2.0 minutes. On this basis the catalase activity of the solution can be said to be 7.04 units per ml at pH 7.0 and 25°C.

Varying amounts of this catalase solution were introduced into a cholesterol assay system containing 0.5 units of cholesterol oxidase in 2.0 ml and the reduction in sensitivity of the assay observed.

| Units catalase added | % reduction in sensitivity |
| --- | --- |
| 0.704 | 95 % |
| 0.352 | 66.4 % |
| 0.074 | 34.3 % |

However, the inclusion of 0.1 % sodium azide in the reaction mixture completely inhibited even the highest level of catalase, thus giving 100 % sensitivity even in the presence of catalase.

Catalast should, however, generally be removed from the preparation or at least reduced in amount, for example by chromatography on DEAE cellulose.

Suitable means for purifying the enzyme preparation obtained by surface active agent extraction and optionally catalase removal include ammonium sulphate precipitation and/or chromatographic methods and/or reduced pressure evaporation. For example the preparation may be concentrated by ammonium sulphate precipitation or polyethylene glycol precipitation, desalted on a Sephadex column and then subjected to ion exchange chromatography. It may be necessary in this step to concentrate the activity of the preparation by about 15 to 40 fold.

For example concentration and purification may be carried out by substrate affinity chromatography. Sephadex LH-20, prepared by hydroxy propylation of G-25, has both hydrophilic and lipophilic properties and can be swollen in polar organic solvents, water, or mixtures thereof. LH-20 may be swollen in ethanol saturated with cholesterol (e.g. approximately 4.0 g %) and a column may be packed with LH-20 prepared in this fashion. Cholesterol may be uniformly distributed throughout the gel by washing the column with distilled water and finally the column may be equilibrated with 0.05M potassium phosphate buffer at pH 7.5. Substantial purification of the enzyme preparation may be achieved by the use of such a column.

Preferably the enzyme preparation is first subjected to ion-exchange chromatography or substrate affinity chromatography, preferably chromatography as DEAE cellulose, and then further concentrated by ultrafiltration or reduced pressure evaporation.

The invention also provides methods for assaying for chlolesterol in a liquid, in particular a biological fluid such as serum or plasma. The assay methods described are not, however, limited to biological fluids and can be applied quite generally for determining the amount of cholesterol present in any industrial or food product or in any industrial process where cholesterol assay may be considered necessary or desirable.

The invention provides a method of assaying for cholesterol in a liquid which comprises incubating the liquid with an enzyme preparation capable of oxidising the cholesterol into $\Delta^4$-cholestenone and hydrogen peroxide and determining the amount of cholesterol present by measuring the amount of hydrogen peroxide produced.

The invention also provides a method of assaying for cholesterol in a liquid which comprises incubating the liquid with a liquid enzyme preparation derived from Nocardia species NCIB 10554 or NCIB 10555 the enzyme preparation having cholesterol oxidase activity and determining the amount in which one of the products of the cholesterol oxidase reaction is formed or the amount in which oxygen is used in the cholesterol oxidase reaction.

The method according to the invention can be used to assay free or total cholesterol in serum. Cholesterol is, of course, never free in plasma in the true sense as it is always combined with phospholipids, proteins and triglycerides in soluble lipoprotein complexes. Incorporation of a surface active agent in the assay mixture, however, causes dissolution of these complexes, under gentle conditions, allowing all the free cholesterol to be enzymically oxidised. The estimation of free cholesterol may be useful for screening purposes and may, in fact, obviate the need to measure total cholesterol.

Cholesterol also occurs in serum in the form of esters and, if total cholesterol is to be assayed, the cholesterol bound in this way must first be brought into a form in which it can be attached by cholesterol oxidase by saponifying the esters, for example by reaction with alcoholic potassium hydroxide. Reaction with 1.0 N KOH at 75°C effects rapid saponification without coagulation of protein.

To conduct the assay the optionally saponified fluid is then incubated with cholesterol oxidase and the reaction

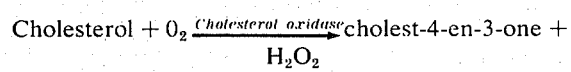

Cholesterol + O$_2$ $\xrightarrow{Cholesterol\ oxidase}$ cholest-4-en-3-one + H$_2$O$_2$ is preferably allowed to go to completion. The amount of cholesterol present is determined by measuring the oxygen uptake or the amount in which at least one of the products if formed. Under suitably standardised conditions it is possible to estimate the amount of cholesterol present from the amount of a product formed or the amount of oxygen used in a given time even if the reaction has not been allowed to go to completion.

As mentioned above, when hydrogen peroxide is estimated fluorimetrically the liquid enzyme preparation should have a cholesterol oxidase specific activity of at least 1 unit per 5 mg of protein nitrogen and a potency of at least $10^{-2}$ units/ml. With any other estimation technique, i.e. measuring the amount of hydrogen peroxide colorimetrically, measuring the oxygen uptake, e.g. with an oxygen electrode, or measuring the amount of $\Delta^4$-cholestenone produced either directly by its carbonyl absorption or by forming a derivative which is measured colorimetrically, the liquid enzyme preparation should have a cholesterol oxidase specific activity of at least 1 unit per 5 mg of protein nitrogen and a potency of at least $10^{-1}$ units/ml.

The assay may, of course, either be carried out as an individual test on a single sample or a plurality of samples may be tested on an automated basis. The preferred enzyme preparation for automated analysis is one with a cholesterol oxidase specific activity of at least 1 unit per 50 µg of protein nitrogen and a potency of at least 0.5 unit/ml.

Preferably the amount of hydrogen peroxide produced is measured by a system which comprises a chromogenic reagent or reagents capable of undergoing a colour change in the presence of hydrogen peroxide, the amount of hydrogen peroxide present being measured by colorimetrically measuring the colour change of the chromogenic reagent or reagents.

In one preferred method the hydrogen peroxide produced is measured by means of quadrivalent-titanium and xylenol orange which react to form a stable red colour with hydrogen peroxide (Taurnes & Nordschow, Amer. J. Clin. Path. (1968), 49, 613). The amount of hydrogen peroxide produced is measured by the intensity of the colour.

In another preferred method the amount of cholesterol present is determined by measuring the amount of hydrogen peroxide produced by means of the reaction with 4-aminophenazone in the presence of excess phenol and peroxidase, the reaction being as follows:

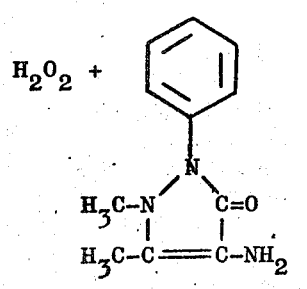
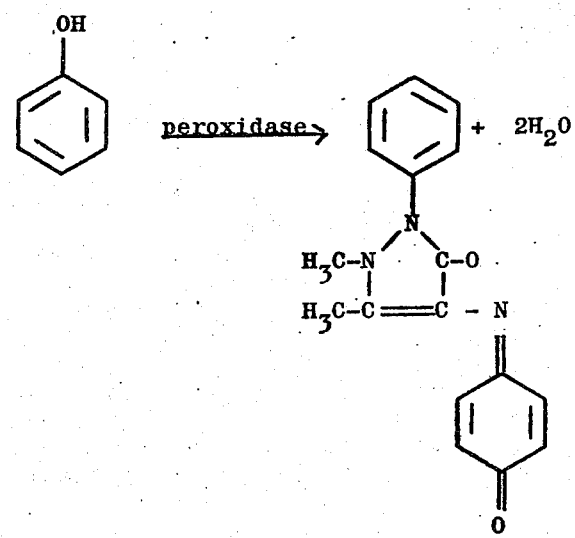

Thus the preferably saponified extract is reacted with cholesterol oxidase in the presence of peroxidase, 4-aminophenazone and phenol and the optical density is measured at 510 nm. It can be shown that there is a linear relationship between the Δ OD (difference in optical density) between a test solution and a control containing no cholesterol and the amount of cholestenone produced. The cholesterol oxidase, peroxidase, 4-aminophenazone and phenol can be made up into a single reagent and used in this form.

In a typical assay according to this method 0.1 ml of serum may be added to 1.0 ml alcoholic KOH (1 N) and incubated at 75°C for 5 minutes. 0.1 ml of the saponified extract may then be added to 2.5 ml of a cholesterol oxidase/peroxidase/4-aminophenzone/phenol reagent and the mixture incubated at 30° to 37°C for 5 minutes and the colour read at 510 nm.

In this test a 0.1% solution of cholesterol may produce a turbidity when added to the enzyme reagent giving an optical density of about 0.05. A 0.1% solution of cholestenone treated in the same manner may also produce a turbidity giving an optical density of about 0.08. These conditions would only be encountered in an extremely abnormal serum containing 1,000 mg % cholesterol but the presence of a surface active agent such as 0.1% Triton X-100 in the enzyme reagent prevents this turbidity, i.e. neither the substrate nor the product produce during the reaction a colloidal suspension which would interfere with spectrophotometry.

Any other suitable reaction of hydrogen peroxide may be used to measure the amount produced and hence the amount of cholesterol in the serum. Examples of such reactions with the references where a fuller description of the reaction may be found are as follows:

1. 2,6-dichlorophenol indophenol can be used as the oxygen acceptor instead of 4-aminophenazone in a coupled peroxidase reaction (Clark & Timms, Proc. Assoc. Clin. Biochem. (1968) 5, 61)
2. Hydrogen peroxide can be reacted with guaiacum in the presence of peroxidase to give a blue product (Morley, Dawson & Marks, Proc. Assoc. Clin. Biochem. (1968) 5, 42)
3. Iodine is liberated from potassium iodide on reaction with hydrogen peroxide and the liberated iodine can then be reacted to form a pink colour with diethyl-p-phenylenediamine (Thompson, Clin. Chim. Acta. (1969) 25, 415)
4. Iodine is liberated from iodide by reaction with hydrogen peroxide and polyvinyl pyrrolidine is used to shift the absorption of iodine from the near u.v. towards the visible where is absorption can be read at 470 nm (Wate and Marbach, Clin. Chem. (1968) 14, 548)
5. Under the action of peroxidase hydrogen peroxide oxidises homovanilic acid to a highly fluorescent product in alkaline solution (Protein does not interfere with this reaction at a 40-fold dilution of plasma). The product can be measured fluorimetrically (Phillips & Elevitch, Amer. J. Clin. Path. (1968) 49, 622)
6. Hydrogen peroxide reacts with iodine in the presence of a molybdenum (IV) catalyst. If a known excess of thiosulphate is used to reduce the iodine as it is produced residual thiosulphate can be titrated coulometrically with iodine. (Simon, Christian & Purdy, Clin. Chem. (1968) 14, 463)

Although measuring the hydrogen peroxide produced is the preferred method of determining the amount of cholesterol present in the biological fluid being assayed it is also possible to use other techniques to obtain the required assay. For example, the oxygen uptake in the cholesterol oxidase reaction can be measured using an oxygen electrode by the technique described by Updike & Hicks in Nature, Lond. (1967) 214, 986 and Makin & Warren in Clin. Chim. Acta. (1970) 29, 493. Alternatively the oxidation product $\Delta^4$-cholestenone can be measured for example as its 2,4-diphenyl hydrazone or iso-nicotinic acid hydrazone, or if a sufficiently pure enzyme is used in a concentration that exhibits low absorption at 240 nm (or if the enzyme is immobilised) the cholesterol can be assayed by the increase in absorption at 240 nm due to the $\Delta^4$-cholestenone formed by enzymic oxidation.

As mentioned above cholesterol assay can either be conducted on an automated basis where a large number of assays are conducted in succession or small numbers of samples can be analysed individually. The reagents required for the assay will depend upon the particular method but when a $H_2O_2$ determination is used as the basis of the assay the reagents will generally comprise (1) the cholesterol oxidase preparation, and (2) one or more other reagents required for determining the amount of $H_2O_2$ produced. Some of the other reagents may be compatible with the cholesterol oxidase and may be incorporated into the enzyme preparation to give a combined reagent. In the case of assay methods requiring the presence of peroxidase this can be included with the cholesterol oxidase to form a combined liquid or freeze dried enzyme preparation. In the case of a freeze dried preparation this is reconstituted before use by addition of buffer. In all cases the reagents are generally supped in a concentrated form and diluted immediately before use. A reagent such as alcoholic potassium hydroxide for saponifying the biological fluid is also required when total cholesterol is to be measured but this will generally be supplied by the user as will buffer and other reagents required for dilution.

For automated analysis the cholesterol oxidase preparation is supplied either in concentrated or freeze dried form to be diluted or reconstituted before use. If required by the analysis the preparation may also contain peroxidase. The other reagents will generally be supplied by the user.

Where individual tests are to be performed kits of the reagents can be supplied.

The invention thus also provides a kit for assaying the amount of cholesterol in a liquid comprising in association i. an enzyme preparation which is derived from Nocardia species NCIB 10554 or NCIB 10555 and which has a cholesterol oxidase specific activity of at least 1 unit per 5 mg of protein nitrogen; and
ii. at least one reagent which is capable of being used in the determination of the amount in which a product is formed in the cholesterol oxidase reaction.

Component (i) is thus the enzyme preparation generally in a form more concentrated than required in the test to be diluted with buffer by the user. The enzyme preparation may be in freeze-dried or in concentrated liquid form. The enzyme preparation may include peroxidase when this is required for the test or any other reagent required in the final assay which is compatible with the cholesterol oxidase.

The kit will, of course, contain each of the components in the amount required for the same defined number of tests. For example the kit may contain sufficient enzyme and other reagents for say 12 tests. Each reagent may be supplied in a single amount, e.g. in a bottle, the amount required for an individual test being extracted from this single amount.

Alternatively the kit may contain unit doses of the enzyme component, each containing at least 0.05 units of cholesterol oxidase activity, i.e. enough for a single test. For example the unit doses of the enzyme preparation may be provided in freeze-dried or concentrated form in individual vials to be reconstituted with buffer before each test.

Component (ii) of the kit is, where hydrogen peroxide is to be determined colorimetrically, usually an oxygen acceptor such as 4-aminophenazone and phenol or xylenol orange and quadrivalent titanium. These other reagents can be supplied in bottles either ready for use or in concentrated form to be diluted by the user.

The user will generally supply the buffer required for dilution, the alkali required for saponification where total cholesterol is to be assayed and any other common reagents which may be required such as solvents for extraction or dilution. Where the assay is for total cholesterol an acid reagent, e.g. dilute HCl or $H_2SO_4$, is required for neutralisation of the reagent used for saponification and this acid reagent may be included in the kit. In cases where $\Delta^4$-cholestenone is determined directly by its carbonyl absorption and there is no colour reagent this acid reagent may be the only other component of the kit apart from the enzyme preparation. If required the kit may include one or more standard cholesterol solutions for standardising the assay.

The invention is illustrated by the following examples although it is to be understood that they do not limit the invention in any way.

EXAMPLE 1

Production of Cholesterol Oxidase 500 litres of sterile growth media were inoculated with 1 litre of a seed culture of Nocardia sp. NCIB 10554. The growth media for both seed and production cultures were:

|  | g/litre |
|---|---|
| $(NH_4)_2SO_4$ | 2.0 |
| $CaCl_2.2H_2O$ | 0.01 |
| $FeSO_4.7H_2O$ | 0.01 |
| $K_2HPO_4$ | 2.0 |
| $MgSO_4.7H_2O$ | 0.2 |
| Glycerol | 10 |
| Yeast Extract | 20 |

The pH is 6.7

The culture was allowed to grow at 30°C for 24 hours. The culture was agitated by an agitator fitted with 3 turbine impellers at 250 rpm and sterile air was supplied through a sparge pipe at 150 litres/min. Foaming was controlled by intermittent addition of polypropylene glycol antifoam. After about 14 hours when the culture had reached a concentration of 1–2 g dry wt/litre, 600 g of cholesterol suspended in 2 litres of a mixture of Tween 80 and water (0.03:1, v/v) was added to the culture. During the growth phase the maximum doubling time for growth was about 2 hours. After 24 hours when the cell concentration was about 6–7 g dry wt/litre the microorganisms were harvested by passage through an intermittent-discharge disc bowl centrifuge at 400 litres/hour. (Alternatively a rotary vacuum pre-coat filter may be used. The fermentation time may be reduced by inoculating with a larger seed culture).

The harvested cells were suspended in 0.01 M potassium phosphate buffer pH 7.0 containing 0.5% (v/v) Triton X-100 at 10°C to give a final volume of 60 litres. After gentle stirring for 2 hours (shorter times may be used with only a slight reduction in the amount of enzyme extracted) the extracted cells were removed by passage through a tubular bowl centrifuge (model 6P, Sharples). The clear supernatant obtained was passed through a column (5 litre capacity) at 5°C containing DE-52 cellulose (previously equilibrated with 0.01 M pH. 7.0 potassium phosphate buffer containing 0.5% Triton X-100). The cholesterol oxidase present and any catalase present was retained by the DE-52 cellulose.

The cholesterol oxidase was released by step-wise elution with increasing molarities of potassium phosphate buffer pH 7.0 (containing 0.5% Triton X-100) at 5°C. Any catalase present remained on the column.

The eluent fractions rich in cholesterol oxidase were further concentrated by ultrafiltration at 5°C. using a PM-30 membrane. The retentate solution obtained (3 litres) had a cholesterol oxidase activity of 5.5 $\mu$mole cholesterol oxidised/ml/min at 37°C. The overall yield was about 20%. This may be increased by washing of discarded solids at the extraction and by collecting a larger fraction at the ion-exchange step. The enzyme solution was stored in a liquid form at 5°C with azide added as a preservative. The solution retained virtually total activity for at least 2 months.

The enzyme preparation had a cholesterol oxidase specific activity of about 1 unit per 28 $\mu$g protein nitrogen and a potency of about 5 units/ml. The preparation contained about 3% v/v. Triton X-100.

EXAMPLE 2

Assay of Free Cholesterol in Serum Principle

Cholesterol oxidase oxidises cholesterol to $\Delta^4$-cholestenone with the simultaneous production of hydrogen peroxide. The hydrogen peroxide produced is chelated with xylenol orange and quadrivalent titanium. The absorption of this red coloured complex is measured at 550 nm.

REAGENTS 1. 0.01 M phosphate buffer pH 7.0 containing 0.10 g % sodium azide.
2. Cholesterol oxidase solution 5 units/ml (1 ml oxidises 5 $\mu$M cholesterol per minute at pH 7.0 and 30°C) contains approx. 3.0 % v/v Triton X-100.
3. Working enzyme solution — 5 ml cholesterol oxidase solution is added to 45 ml of the 0.01 M phosphate buffer.
4. Sulphuric acid 2N — 56 ml concentrated sulphuric acid is added to distilled water and diluted to 1 litre.
5. Stock titanium 0.001 M — 0.08 g titanium dioxide is placed in a 25 ml conical flask and 0.5 g ammonium sulphate and 2.5 ml concentrated sulphuric acid are added. This mixture is heated on a hot plate until all of the material is dissolved and is colourless. The solution is cooled and made up to one litre with distilled water.
6. Stock xylenol orange 0.001 M — 0.76 g xylenol orange is dissolved in distilled water and diluted to 1 litre.
7. Combined colour reagent — Add one volume of stock titanium to 0.5 volume of 2N sulphuric acid, mix. Add one volume of stock xylenol orange and 0.5 g Brij-35 (polyoxyethylene lauryl ether) per 1 litre of reagent.
8. Cholesterol standards containing up to 5.0 mM per litre. Prepared by dissolving pure dry cholesterol (BDH Biochemical Standard) in isopropyl alcohol.

METHOD

100 $\mu$l serum or standard are added to 2.0 ml working enzyme solution and incubated at 37°C for 5 minutes. 1.0 ml of the combined colour reagent is then added and the mixture incubated for a further 5 minutes at 37°C.

Blanks are prepared by adding serum or standard directly to a mixture of 2.0 ml working enzyme solution and 1.0 ml combined colour reagent.

The optical density of the test solution is read against its blanks at 550 nm.

EXAMPLE 3

Assay of Total Cholesterol in Serum Principle

Cholesterol is released from lipoprotein complexes and hydrolysed from its esters by alkaline hydrolysis. Following neutralisation of the hydrolysate the cholesterol is enzymically oxidised to $\Delta^4$-cholestenone. $\Delta^4$-cholestenone is then extracted from the reaction mixture and its absorption at 236 nm is measured.

REAGENTS 1. 0.05 M phosphate buffer pH 7.0.
2. Cholesterol oxidase — Stock solution containing 5.0 units/ml and 3.0 % v/v Triton X-100.
3. Working enzyme — 5.0 ml of the cholesterol oxidase stock solution is added to 45 ml of the 0.05 M phosphate buffer pH 7.0 (1).
4. Ethanolic KOH (1N) — A "Volucon" ampoule (May and Baker Ltd) to make 1 litre 1 N KOH is diluted to 100 ml with distilled water and made up to 1 litre with absolute alcohol.
5. 0.083 N Hydrochloric Acid containing 0.3 % v/v Triton X-100.
6. Cholesterol Standards up to 12.9 mM (500 mg %). Prepared by dissolving pure dry cholesterol (BDH Biochemical Standard) in isopropyl alcohol.
7. Cyclohexane

METHOD 0.2 ml serum or standard is added to 1.0 ml ethanolic KOH and the mixture incubated for 5 minutes at 75°C. in stoppered tubes.

0.1 ml of the saponified extract is now added to 1.0 ml of 0.083 N HCl containing 0.3 % Triton X-100. The solution is mixed before adding 1.0 ml of the working enzyme solution. After addition of the cholesterol oxidase the reaction mixture is incubated at 37°C for 10 minutes.

5.0 ml ethanolic KOH are now added and the $\Delta^4$-cholestenone formed during the reaction is extracted into 3.0 ml cyclohexane.

Blanks are run in a similar fashion except that the working enzyme solution is not added until after the addition of the ethanolic KOH.

The optical density of an extract is read against its blank at 236 nm. EXAMPLE 4

Kit Formulation for Assay or Free Cholesterol in Serum Principle

Cholesterol oxidase oxidises cholesterol to $\Delta^4$-cholestenone with the simultaneous production of hydrogen peroxide. The hydrogen peroxide produced is chelated with xylenol orange and quadrivalent titanium. The absorption of this red coloured complex is measured at 550 nm.

REAGENTS 1. 0.01 M phosphate buffer pH 7.0 containing 0.10 g % sodium azide.
2. Cholesterol oxidase solution 5 units (1 ml oxidises 5 pM cholesterol per minute at pH 7.0 and 30°C) containing 3.0 % v/v Triton X-100.
3. Working enzyme solution — 5 ml cholesterol oxidase solution is added to 45 ml of the 0.01 M phosphate buffer (1).
4. Sulphuric acid 2N — 56 ml concentrated sulphuric acid is added to distilled water and diluted to 1 litre.
5. Stock titanium 0.001 M — 0.08 g titanium dioxide is placed in a 25 ml conical flask and 0.5 ammonium sulphate and 2.5 ml concentrated sulphuric acid are added. This mixture is heated on a hot plate until all the material is dissolved and is colourless. The solution is cooled and made up to one litre with distilled water.
6. Stock xylenol orange 0.001 M — 0.76 g xylenol orange is dissolved in distilled water and diluted to 1 litre.
7. Combined colour reagent — One volume of stock titanium is added to 0.5 volume of 2N sulphuric acid and mixed. One volume of stock xylenol orange and 0.5 g Brij-35 (polyoxyethylene lauryl either) per litre of reagent is then added.
8. A cholesterol standard containing up to 3.0 mM per litre is prepared by dissolving pure dry cholesterol (BDH Biochemical Standard) in isopropyl alcohol.

The kit for 20 tests includes two reagents A and B and a standard cholesterol solution (reagent 8 above)

Reagent A — 80 mls Cholesterol oxidase solution prepared as reagent (3) above.

Reagent B — 40 mls combined colour reagent prepared as reagent (7) above.

METHOD

Add 100 µl serum or cholesterol standard to 2.0 ml reagent A and incubate at 37° C for 10 minutes.

Add 1.0 ml reagent B to the reaction mixture and continue incubation at 37°C for a further 5 minutes.

Blanks are prepared by adding serum or cholesterol standard directly to a mixture of 2 mls reagent A and 1.0 ml reagent B and incubating for 5 minutes at 37°C.

The optical densities of the test solutions are read against their corresponding blanks at 550 nm.

CALCULATION OF RESULTS nM cholesterol for litre test = $3.0 \times OD_{550}$ test/$OD_{550}$ standard.

EXAMPLE 5

Kit Formulation for Assay of Total Cholesterol in Serum Principle

Cholesterol is released from lipoprotein complexes and hydrolysed from its esters by alkaline hydrolysis. Following neutralisation of the hydrolysate the cholesterol is enzymically oxidised to $\Delta^4$-cholestenone and its absorption at 236 nm is measured.

REAGENTS 1. 0.05 M phosphate buffer pH 7.0
2. Cholesterol oxidase — Stock solution containing 5.0 units/ml and 3.0 % v/v Triton X-100.
3. Working enzyme — 5.0 ml of the cholesterol oxidase stock solution is added to 45 ml of the 0.05 M phosphate buffer pH 7.0 (1).
4. Ethanolic KOH (1N) — Volucon ampoule (May & Baker Limited) to make 1 litre 1N KOH is diluted to 100 ml with distilled water and made up to 1 litre with Absolute Alcohol.
5. 0.083 N Hydrochloric Acid containing 0.3 % v/v Triton X-100.
6. Cholesterol Standard up to 12.9 mM (500 mg %) prepared by dissolving pure dry cholesterol (BDH Biochemical Standard) in isopropyl alcohol.
7. Cyclohexane.

A kit for 20 tests includes two reagents A and B and standard Cholesterol solutions (reagent 6 above)

Reagent A — Cholesterol oxidase — 80 ml working enzyme (reagent 3).

Reagent B — 80 mls. 0.083 N hydrochloric Acid containing 0.3 % v/v Triton X-100.

Ethanolic KOH and cyclohexane are provided by the user, as the former is unstable and both are required in relatively large volumes.

METHOD 0.2 ml serum or standard is added to 1.0 ml ethanolic KOH and the mixture incubated for 5 minutes at 75° in stoppered tubes.

0.1 ml of the saponified extract is now added to 1.0 ml 0.083 N HCl containing 0.3 % Triton X-100 (Reagent A). The solution is mixed before adding 1.0 of the working enzyme solution (Reagent B). After addition of the cholesterol oxidase the reaction mixture is incubated at 37° for 10 minutes.

5.0 ml ethanolic KOH are now added and the $\Delta^4$-cholestenone formed during the reaction is extracted into 4.0 ml cyclohexane.

Blanks are run in a similar fashion except that the working enzyme solution is not added until after the addition of the ethanolic KOH.

The optical density of the extracts is read against their blanks at 236 nm.

I claim:

1. An enzyme preparation useful for the enzymatic determination of the amount of cholesterol in a given sample, said enzyme preparation being derived from Nocardia species NCIB 10554 (NRRL 5635) or NCIB 10555 (NRRL 5636), by growing said Nocardia species in a suitable medium and recovering the enzyme preparation which is characterized by having a cholesterol oxidase specific activity of at least 1 unit per 5 mg of protein nitrogen and capable of oxidizing cholesterol to $\Delta^4$ cholestenone and hydrogen peroxide.

2. An enzyme preparation according to claim 1, in liquid form and having a potency of at least $10^{-2}$ units/ml.

3. An enzyme preparation according to claim 2 having a potency of at least $10^{-1}$ units/ml.

4. An enzyme preparation according to claim 1 having a cholesterol oxidase specific activity of at least 1 unit per 50 $\mu g$ of protein nitrogen.

5. An enzyme preparation according to claim 4, in liquid form and having a potency of at least 0.5 unit/ml.

6. An enzyme preparation according to claim 4 in freeze-dried or other solid form.

7. An enzyme preparation according to claim 1 which has a catalase activity of less than $10^{-1}$ units per unit of cholesterol oxidase activity.

8. An enzyme preparation according to claim 7 having a catalase activity of less than $10^{-2}$ units per unit of cholesterol oxidase activity.

9. An enzyme preparation according to claim 8, containing a catalase inhibitor.

10. An enzyme preparation according to claim 7, which also contains peroxidase activity.

11. A method of preparing an enzyme preparation having cholesterol oxidase activity, which comprises growing Nocardia species NCIB 10554 (NRRL 5635) or NCIB 10555 (NRRL 5636), in a suitable medium, harvesting the cells, extracting said cells with a surface active agent and recovering therefrom an enzyme preparation having a cholesterol oxidase specific activity of at least 1 unit per 5 mg of protein nitrogen and capable of oxidizing cholesterol to $\Delta^4$ cholestenone and hydrogen peroxide.

12. A method according to claim 11 in which said surface active agent is a non-ionic surface active agent.

13. A method according to claim 11 in which said surface active agent is iso-octyl-phenoxypolyethoxyethanol containing approximately 10 moles of ethylene oxide.

14. A method of preparing an enzyme preparation having cholesterol oxidase activity which comprises growing Nocardia species NCIB 10554 (NRRL 5635) or NCIB 10555 (NRRRL 5636), harvesting the cells, disrupting said cells, removing cell debris and recovering therefrom an enzyme preparation having a cholesterol oxidase specific activity of at least 1 unit per 5 mg of protein nitrogen and capable of oxidizing cholesterol to $\Delta^4$ cholestenone and hydrogen peroxide.

15. A method of preparing an enzyme preparation having cholesterol oxidase activity, which comprises aerobically growing Nocardia species NCIB 10554 (NRRL 5635) or NCIB 10555 (NRRL 5636) in a medium comprising glycerol as a carbon source, harvesting the cells, extracting said cells with a surface active agent and recovering an enzyme preparation having a cholesterol oxidase specific activity of at least 1 unit per 5 mg of protein nitrogen and capable of oxidizing cholesterol to $\Delta^4$ cholestenone and hydrogen peroxide.

16. A method according to claim 15 in which said medium has a pH of from 6 to 8.

17. A method according to claim 15 in which growth is carried out in the presence of cholesterol.

18. A method according to claim 15 in which after extraction of said cells with said surface active agent to produce an extract, said extract is further purified by ion exchange chromatography or substrate affinity chromatography.

19. A method according to claim 15 in which after extraction of said cells with said surface active agent to produce an extract, said extract is further purified by ion exchange chromatography on DEAE cellulose.

20. A method according to claim 18 in which said extract purified by chromatography is further concentrated by ultrafiltration or reduced pressure evaporation.

21. A method according to claim 15 which comprises converting said enzyme preparation into the freeze-dried or other solid form.

* * * * *

UNITED STATES PATENT OFFICE
CERTIFICATE OF CORRECTION

PATENT NO. : 3,907,642
DATED : September 23, 1975
INVENTOR(S) : WILLIAM RICHMOND It is certified that error appears in the above-identified patent and that said Letters Patent are hereby corrected as shown below:

The priority date "June 11, 1972" should read -- June 19, 1972 --.

Under the title "References Cited", second line insert the following references:

-- Chemical Abstracts 69 57563q (1907). --.

Line 2 of the second column insert the following references:

-- J. Bact. Vol. 58 pages 117-125 (1949).

Sci Repts 1st Super Sanita Vol. 1 pages 326-337 (1961).

Methods in Enzymol. Vol. 1 pages 678-681 (1955).
French Patent No. 2,047,147. --

In the specification, column 1, line 35 last word should read --so-called--.

Signed and Sealed this thirteenth Day of April 1976

[SEAL]

Attest:

RUTH C. MASON
Attesting Officer

C. MARSHALL DANN
Commissioner of Patents and Trademarks